April 19, 1932.  C. H. HAPGOOD  1,854,306
MILKING MACHINE
Filed Aug. 7, 1928   2 Sheets-Sheet 1

WITNESS:

INVENTOR
Cyrus Howard Hapgood
BY
Busser and Harding
ATTORNEYS.

April 19, 1932.　　　C. H. HAPGOOD　　　1,854,306
MILKING MACHINE
Filed Aug. 7, 1928　　　2 Sheets-Sheet 2
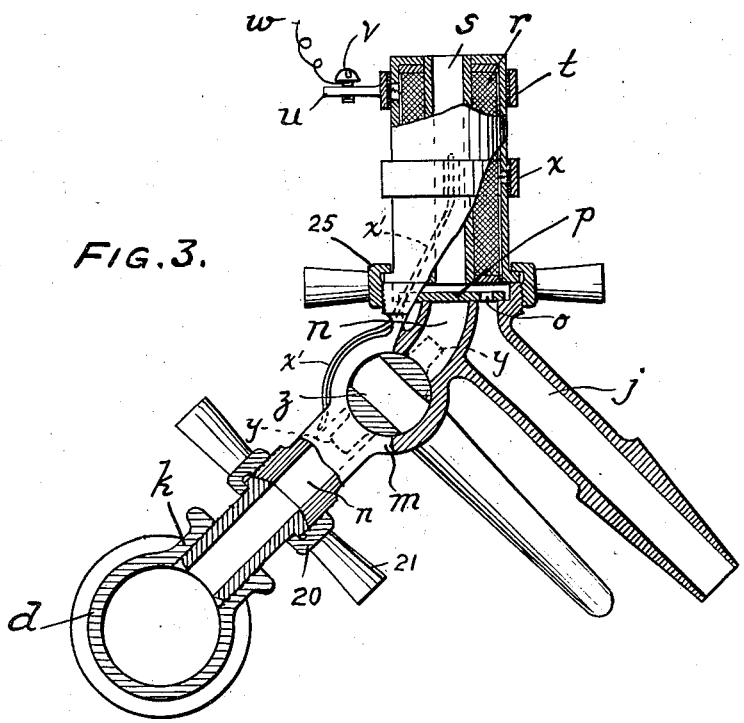
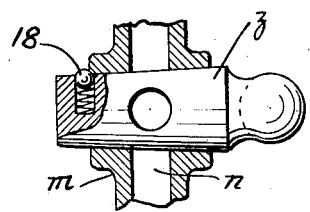
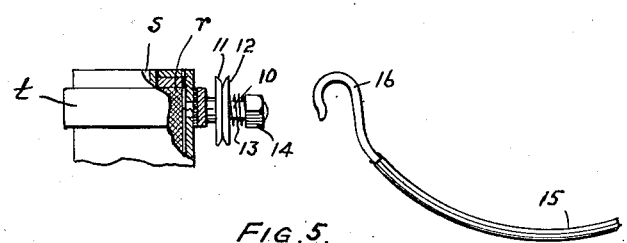
WITNESS:　　　　　　　　　　　　　　　　INVENTOR
Cyrus Howard Hapgood
BY
Busser and Harding
ATTORNEYS.

Patented Apr. 19, 1932

1,854,306

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed August 7, 1928. Serial No. 297,951.

It is known in the art to provide a milking machine comprising a double-chambered teat cup, a milk pipe line, a detachable hose for establishing communication between the milk line and the inner milk chamber of the teat cup, a pulsation pipe line, a detachable hose through which pneumatic pulsations are transmitted, directly or through a claw pulsator, to the outer pulsation chamber of the teat cup, a releaser communicating with the milk pipe, and a vacuum pipe between a source of suction and the releaser. A pneumatic pulsator produces pulsations in the pulsation pipe line. Usually pneumatic pulsations are produced in the discharge compartment of the releaser by means of a relay pulsator which is connected with the vacuum line and the pulsation line and transmits pulsations, through a short pipe, direct to the releaser discharge. See the Daysh Patent No. 1,548,827, dated Aug. 11, 1925.

It has been contended that, due probably to leakage of very small quantities of oil vapor into the releaser, the flavor of the milk is sometimes deleteriously affected. I have discovered that if, for a pneumatically operated relay pulsator, there is substituted an electrically operated pulsator, similar to those heretofore applied to the milk pail in the pail system of milking, the causes tending to affect the flavor of the milk are removed. The invention comprises means whereby an electrically operated pulsator is adapted to a releaser. The invention is applicable to milking machines of different types, including those wherein pneumatic pulsations are produced in the outer teat cup chambers by means of pneumatically or electrically operated pulsators.

The invention also comprises means to insure against contamination of atmospheric air that flows into the discharge chamber of the releaser.

It has been found advisable to frequently clean, preferably after each milking, the connections between the vacuum pipe and pulsator and between the pulsator and releaser. A further object of my invention is to produce a construction whereby this can be done quickly and thoroughly.

In the drawings, which show a preferred embodiment of the invention:

Fig. 3 is a sectional view of the electrically actuable pulsator and the pipe connections to which it is applied.

Fig. 4 is a detail sectional view of the plug valve controlling the connection of the releaser with vacuum.

Fig. 5 is a side view, partly in section, of the means for closing the circuit through the electro-magnet of the pulsator.

Figure 1:
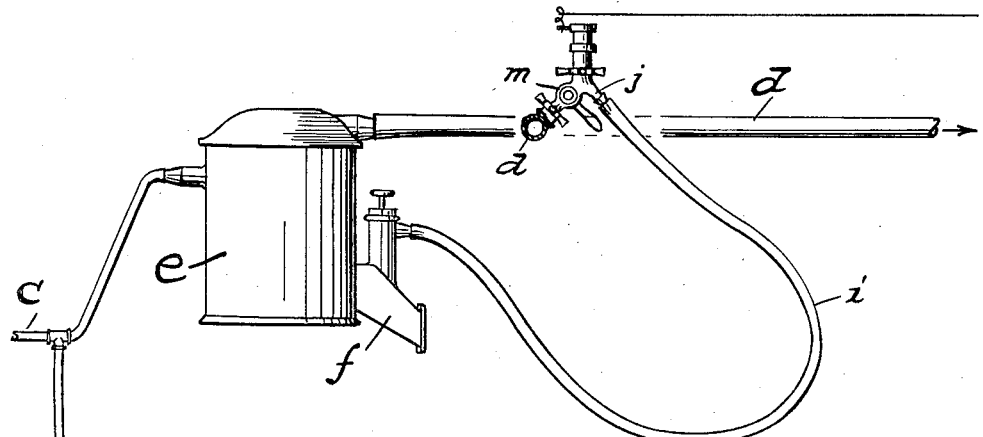
Fig. 1 is a view, partly diagrammatic, in side elevation of a milking machine of the releaser type embodying my invention.
Figure 2:
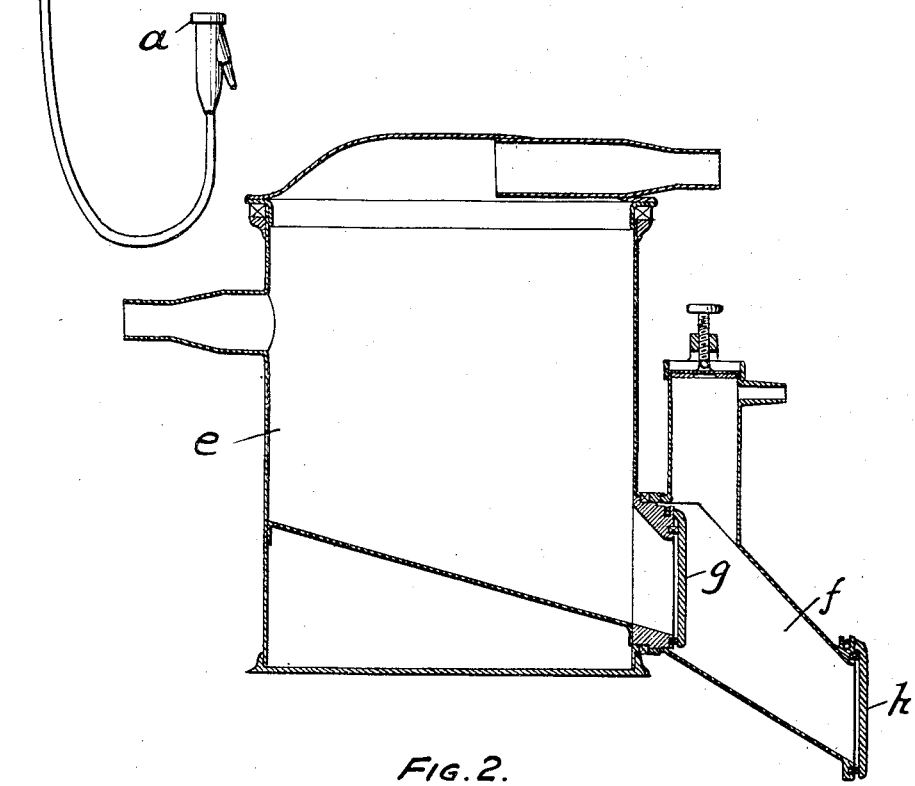
Fig. 2 is a vertical sectional view of the releaser.

In Fig. 1 is shown one teat cup $a$ of a set of teat cups, a milk hose $b$ connecting the same with a milk pipe line $c$ leading to the milk receiving chamber $e$ of a releaser, a vacuum pipe line $d$ connected to the milk receiving chamber of the releaser, and a detachable hose $i$ through which pnuematic pulsations are conveyed to the discharge chamber $f$ of the releaser. A flap valve $g$ closes communication between chambers $e$ and $f$ when the pressure rises in chamber $f$, and swings open, under pressure of the milk, when the pneumatic pressure in the two chambers is equalized, to allow milk to flow from chamber $e$ to chamber $f$. A flap valve $h$, which governs the discharge of milk from chamber $f$, swings open, under the pressure of milk, when the pneumatic pressure rises in chamber $f$, to allow discharge of milk, and closes, under pressure of the atmosphere, when the pressure falls in chamber $f$. This is a known construction of releaser. Other details of the milking machine are not shown, since they are not involved in the invention.

Threaded on the vacuum pipe $d$ is a nozzle $k$, which projects diagonally upward from the vacuum pipe. $m$ is an angular connector having a vacuum passage $n$ communicating and aligning with nozzle $k$ and a pulsation passage $j$ extending diagonally downward from the upper end of passage $n$ and to which the hose $i$ is adapted to be connected. The upper end of the pulsation passage $j$ surrounds the upper end of the vacuum passage $n$ and both passages communicate with a common chamber in which is positioned a disc valve $p$ provided with a port or ports $o$.

Mounted on the valve chamber of connector $m$ is an iron-enclosed electro-magnet $r$. The field winding of the magnet surrounds a vertical tube $s$ which, at its upper end, is open to the atmosphere or other source of relatively high pressure. The disc valve $p$, which functions as the valve of a pneumatic pulsator, also functions as the armature of the magnet. When armature-valve $p$ drops into its lower position, it closes communication between passage $n$ and the valve chamber, and air flows through the tube $s$ and ports $o$ into passage $j$ and around the periphery of the valve. When the magnet is energized, the armature-valve rises and closes communication between tube $s$ and the valve chamber and opens communication between the passage $n$ and the valve chamber, thereby connecting passage $j$ with the vacuum line.

One of the terminals of the field winding of the magnet may extend out through holes in the magnet casing to a ring $t$ secured to and insulated from the magnet casing. The ring $t$ carries a bracket $u$. By means of a screw $v$ thereon, a wire $w$, connected with one pole of an electric circuit, may be clamped to bracket $u$ and be thereby electrically connected with one terminal of the field winding. The other terminal of the field magnet may connect with a ring $x$ secured to and insulated from the casing. To this ring may be secured an elastic and flexible contact finger $x'$ which is adapted to be engaged by one of the lugs $y$ on the plug valve $z$ positioned on the connector $m$ across vacuum passage $n$. If the vacuum pipe $d$ is connected to the other pole of the electric circuit, the opening of the valve $z$ to connect the chamber $f$ with vacuum will at the same time energize the electro-magnet when the circuit thereto is closed. In the circuit to the magnet is interposed an electric pulsator, well known in the art and not shown, which alternately opens and closes the circuit. Thereby, the electro-magnet is alternately energized and de-energized, thereby reciprocating the armature-pulsator $p$ and creating pneumatic pulsation in pulsation passage $j$.

Instead of electrically connecting one terminal of the field magnet with the vacuum pipe $d$ by the means described, the connection thereto may be a permanent one. In either case it is preferred to substitute for the binding posts $u$, $v$, a detachable electric connection in order that the circuit to the electro-magnet may be easily disconnected when removing the pulsator for washing. For this purpose the ring $t$ (see Fig. 5) carries a pin 10 on which are sleeved discs 11 and 12, which are normally held in contact by a spring 13 engaging a nut 14 secured to a threaded end of the pin. Connected to one pole of the electric circuit is a flexible electric wire 15 carrying at its end a hook 16, which is adapted to be forced between the opposing bevelled faces of discs 11 and 12 and thereby electrically connect one terminal of the field winding of the magnet to one pole of the electric circuit.

The plug valve $z$ is frusto-conical in shape, its end of smaller diameter having a recess in which is inserted a spring-pressed ball 18 which, when the plug is pushed down in its housing, is sprung out under the connector $m$ and holds the plug in position, although permitting its withdrawal by the exercise of a moderate pulling force.

The connector $m$ is secured to the nozzle $k$ by means of a union 20, which has a flange which abuts against an end flange on the nozzle and is in screw-threaded engagement with the connector; the connector having wings 21 by which the union may be turned to connect or disconnect the nozzle and connector. By means of a similar union 25, which has a flange engaging a flange on the magnet casing and is in screw-threaded engagement with the connector, the magnet may be connected with or disconnected from the connector. By slipping off the hose $i$ and by giving the union 20 the few turns required to unscrew it from the connector, the latter may be detached from the nozzle. By removing hook 16 from between discs 11 and 12, the electric connection may be broken. By giving the union 25 a few turns to unscrew it from the connector, the electro-magnet may be detached from the connector. The connector may now be cleaned, the electro-magnet may be re-attached to the connector, the connector re-attached to the vacuum pipe, the hook 16 forced between the discs, and the hose $i$ re-applied to the connector; and the machine is again ready for operation.

While an electric pulsator constructed and arranged substantially different from that herein described would prevent the leakage of oil into the releaser, it would not insure against atmospheric air, entering the discharge chamber $f$, carrying with it condensed vapor, wash water or other liquid. As hereinbefore described, air is alternately admitted to and exhausted from this discharge chamber through the hose $i$ and the connector shown in Fig. 3. It is of the utmost importance that air admitted to this discharge chamber should be uncontaminated. The connector shown in Fig. 3 insures against such contamination. When the connector $i$ secured to the vacuum line, any liquid that may be in the valve chamber or nozzle $j$ will drain out before the nozzle is connected, by the rubber $i$, with the discharge chamber $f$ of the releaser. Any moisture that may be in the section of vacuum passage $n$ below the valve $z$ will flow into the vacuum pipe $d$. Any liquid that may be trapped in the section of passage n above the valve will flow into the vacuum pipe d when the valve is open.

It will, therefore, be clear that in a construction embodying my invention, the milk in and discharging from the releaser is insured against contamination from oil vapor, condensed vapor, wash water or other liquid.

What I claim and desire to protect by Letters Patent is:

In a milking machine, the combination with a vacuum pipe, of an angular connector one arm of which extends diagonally upward from the vacuum pipe and the other arm of which extends diagonally downward from the end of the first arm, there being a passage in one arm the upper end of which surrounds a passage in the other arm, a disc valve adapted to seat on the upper end of one of the passages, and an electromagnet mounted on the angle of the connector and adapted to be intermittently actuated, whereby the valve is alternately seated and unseated.

In testimony of which invention, I have hereunto set my hand, at city of New York, on this 3rd day of August, 1928.

CYRUS HOWARD HAPGOOD.